United States Patent Office 3,102,895
Patented Sept. 3, 1963

3,102,895
3α-AMINO-ALLOPREGNANES
Jean Louis Paul Mainil, Boitsfort, Belgium, assignor to Societe Anonyme Oletta, Luxembourg, Luxembourg
No Drawing. Original application Sept. 26, 1958, Ser. No. 763,431. Divided and this application June 12, 1962, Ser. No. 201,790
Claims priority, application Belgium Sept. 27, 1957
6 Claims. (Cl. 260—397.3)

The present invention relates to chemical products, such as new pharmaceutical products, and more particularly to alkaloids and principles isolated from plants of the genus Funtumia (Apocynaceae) and more particularly from the species F. latifolia. This application is a divisional based on my earlier application, Serial No. 763,431, filed September 26, 1958.

Investigations have shown that crystallizable alkaloids and principles, combined with the latex of this plant, can be isolated in an advantageous and economic yield from this species of the genus Funtumia and from any part of the plant.

These alkaloids and bases are useful in veterinary therapy and as an intermediary product (raw product) for synthesis of other steroids. More particularly, the alkaloids are useful in controlling respiratory action and the nervous systems of animals. They are two in number, and are hereinafter called alkaloids A and C, respectively.

The physiological properties of alkaloids A and C have been the subject of experiments and more detailed particulars will hereinafter be given.

For the isolation of these products, use is made of one of the methods generally employed for the isolation of alkaloids from plants, account being taken of the fact that each fraction is combined with the latex and/or the chlorophyll of the plant.

The plants or parts thereof, such as the leaves, trunk bark or roots, depending on the season at which the crop is taken, are crushed and then washed in petroleum ether. The cells are burst by a current of steam or by other chemical or physical means. The plants are then made alkaline with a solution either of 20% ammonia or of 10% or 5% sodium carbonate, or with milk of lime or of magnesia, or they are moistened with water.

After contact for several hours with the alkaline medium, the plant is extracted in a Soxhlet apparatus, a mixer, a percolator or a rotative extractor, with petroleum ether, ether, benzene, chloroform, ethyl acetate or other solvents polar or non-polar chlorinated or non-chlorinated, alone or in admixture.

After complete extraction of the plant with one of these solvents or a mixture thereof, the extracts are stirred with a solution of acetic, hydrochloric, oxalic or other acid sufficiently strong to displace the principles combined with the rubber and with the chlorophyll. It is generally desirable to use concentrations of at least 25%, depending upon the acids.

The solvent and the acid are separated, if necessary with filtration. The aqueous part is added to any solid part remaining on the filter.

The principles in acid solution are made alkaline with ammonia or by a sodium carbonate solution so as to dissociate the principles A and C from the other principles. The alkaloid is then extracted by means of a solvent or a mixture of solvents immiscible with water, such as ether or chloroform, or miscible with water, such as ethyl or methyl alcohol. On distillation, a residue is obtained and is dried, the residue consisting of the alkaloids or bases mixed with other substances and resins heretofore regarded as impurities.

These substances A and C are taken up individually in methanol and, if desired, recrystallized several times.

The substance having a melting point of 260° C. can also be obtained by distilling or otherwise treating the extraction solvents after elimination of the basic principles and of the chlorophyll and by recrystallizing this substance from, for example, methanol or ethyl acetate.

Experience shows that the product obtained is a sapogenin which is positive to Liebermann's reaction. Its infra-red spectrum shows an OH band at about 3 m$\mu$ and a C—O band at about 6 m$\mu$. This substance contains no nitrogen.

The crude residual mixture of alkaloids and bases can also be obtained by extraction with acid water or neutral or acid alcohol by concentrating and extracting the residue by means of a solvent immiscible in the alkaline phase.

The residual mixture can be directly treated by successive recrystallizations until pure principles are obtained.

The chemical characteristics of bases A and C are as follows.

Alkaloid (principle) A—
  Empirical formula: $C_{21}H_{37}ON$
  Developed formula: 3-α-amino-allopregnane-20-ol
  Infra-red spectrum: OH, NH bands at about 3$\mu$; no C=O bands. Its chlorhydrate has at 2080 cm$^{-1}$ a band $HN_3^+$
  Melting point: 182° C. [α]$_D$=±0 in methanol.
    Gives a hydrochloride of M.P. 290° C.

Alkaloid (principle) C—
  Empirical formula: $C_{21}H_{35}ON$
  Developed formula: 3-α-amino-allopregnane-20-one
  Melting point: 123° C.

It gives a hydrochloride of M.P. 280° C. having a rotatory power of +60 in methanol and the infra-red spectrum of which exhibits NH bands in the region of 3$\mu$, a NH$_3^+$ band at 4.9$\mu$, a C=O band at about 5.9$\mu$ and another band at about 6.2$\mu$, which may correspond to a C=C vibration.

These reactions and identifications shown that it is a ketonic alkaloid.

| Toxicity DL$_{50}$ | Alkaloid A, 28 mg./kg. | Alkaloid C, 30 mg./kg. |
|---|---|---|
| Action on the central nervous system. | 5 times more anaesthetic than cocaine on the cornea of the rabbit. Temperature reducer and antipyretic. | 5 times more anaesthetic than cocaine on the cornea of the rabbit. Temperature reducer and antipyretic. |
| Cardiotonic | On the isolated auricle. On the rabbit's heart in situ. | On the isolated auricle. On the rabbit's heart in situ. |
| Respiratory analeptic | On the normal rabbit and on the morphinized rabbit. | On the normal rabbit and on the morphinized rabbit. |
| Cardiovascular | Vasodilatation hypotension. | Vasodilatation hypotension. |
| Kidney | Diuretic | No action. |
| Anabolic | Slightly per os nil by injection. | |
| Hormonal and metabolic action. | No oestrogenic action. No androgenic action. No folliculino-stimulant action. | No oestrogenic action. No folliculino-stimulant action. |
| Suprarenal | Weight unchanged after 40 days as compared with controls. Ascorbic acid and cholesterol content unchanged as compared with controls. | Weight unchanged after 40 days as compared with controls. Ascorbic acid and cholesterol content unchanged as compared with controls. |
| Liver | Slight increase in dry weight. Prevents glycogen depletion of the liver (like cortisone). | Prevents glycogen depletion of the liver (like cortisone). |
| Tranquilizing Action | 25 mg./kg. per day reduces the motility of rats by changing the number of movements recorded in 6 hours from 16,500 to 2,500. | |

Injectable solutions containing 5 mg./cc. of the hydrochloride of alkaloid A or C can be prepared by dissolving it in propylene glycol (30 parts) diluted with distilled water (70 parts). Other injectable solvents such as methyl acetamide, etc., may be employed. Concentrations of 1 mg/cc. of hydrochloride can be obtained in distilled water alone.

It is also possible to prepare tablets for therapeutic use by using, for example, the following recipe:

| | |
|---|---|
| Hydrochloride of alkaloid A or C | 10 mg. or 25 mg. |
| Lactose | 71 mg. or 56 mg. |
| Rice starch | 80 mg. or 80 mg. |
| Magnesium stearate | 2 mg. or 2 mg. |
| Talc | 37 mg. or 37 mg. |

For example, the alkaloid and the lactose are granulated. After drying, the other ingredients are added to enable ready dissolution in the stomach and lubricants to enable ready compression of the tablets.

Principles A and C may be converted into mineral salts, such as sulphates, hydrochlorides, nitrates or hydrobromides, or into organic salts, such as tartrates, citrates, gluconates, camphorates, camphosulfonates and acetates.

For the production of hydrochlorides of bases A and C, the purified base in suspension in very hot water may be employed as starting material. The pH value is adjusted to 4 with a mixture of methanol and hydrochloric acid and the white hydrochloride is allowed to cool. They are very sparingly soluble in the cold.

The alkaloids A and C, hereinafter called Funtumidine and Funtumine, respectively, may be used as starting materials for the production of other steroids, particularly for obtaining dihydro-progesterone in an advantageous yield (allopregnane-3-20-dione).

It is particularly advantageous to obtain these substances by preparing the chloramine by action of hypochlorous acid in ethereal solution. This chloramine is dechlorinated by means of sodium ethylate and the ketamine obtained is hydrolyzed in sulphuric acid solution to give allopregnane-3-20-dione in a good yield.

EXAMPLE

The calculated quantity of hypochlorous acid in ethereal solution, cooled to −20° C. (the quantity is calculated mol. per mol.) is added dropwise to 1 gram of alkaloid C in solution in ethereal solution cooled to 10° C., with agitation. The entire operation is carred out in the presence of anhydrous sodium sulphate so as to avoid the presence of water.

The ethereal hypochlorous acid solution is prepared by the method of Wohl and Goldschmidt, Ber. 46; 2731 (1913). After agitation for one hour, the ethereal solution is filtered to separate the sodium sulphate, and is evaporated to dryness in vacuo. The crystalline residue is boiled under reflux for 40 minutes with a solution of sodium ethylate in 50 ml. of absolute ethanol. The solution is thereafter poured into 300 ml. of water slightly acidified with sulphuric acid. The mixture is allowed to stand for 24 hours and the precipitate formed is suction filtered and dissolved in chloroform. The chloroformic solution is washed with water, dried and evaporated to dryness in vacuo. A residue weighing ±800 mg. is obtained.

After recrystallization from hexane and alcohol, allopregnane-3-20-dione, M.P. 200–202° C. and $(\alpha)_D$ +128 (CHCl$_3$), is obtained.

By the same method, alkaloid A or its 20-position epimer can be converted into the two sterolic alcohols 20-hydroxy-allopregnane-3-one.

Alkaloid A is advantageously oxidized to give alkaloid C in ketonic form by the use of chromic acid in acetic acid solution or by any other method.

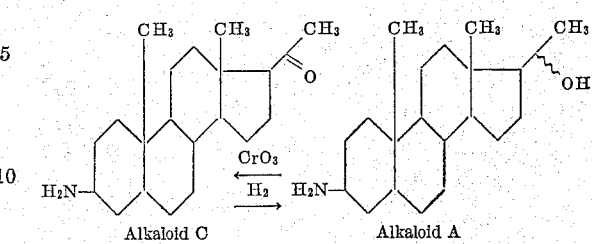

The invention also concerns the production of derivatives of alkaloid C. (Funtumine) preserving the amino function in the 3-position, as follows:

(1) Reduction of the ketone function of alkaloid C into an alcohol function (Funtumidine)

3-α-amino-20-β-hydroxy-allopregnane—Funtumidine.—Funtumidine is advantageously obtained by reduction of Funtumine by means of sodium in alcohol.

200 mg. of funtumine are dissolved in 20 cc. of absolute alcohol. To this solution, maintained at boiling point, are added in small fractions, over the course of 1 hour, 3 times the calculated quantity of sodium. The alcohol is driven off by distillation in vacuo and the residue is taken up in water and extracted with methylene chloride. The organic solution is dried over anhydrous sodium sulphate, filtered and distilled to dryness. The residue (200 mg.) is crystallized from ethyl acetate and gives the dihydrogenated derivative of Funtumine, which is identical with Funtumidine, M.P. 178, $(\alpha)_D$ +10 (CHCl$_3$).

3-α-amino-20-β-hydroxy-allopregnane—20-epi-Funtumidine.—The epimer of Funtumidine is obtained by the reduction of Funtumine by means of potassium borohydride in solution in methyl alcohol.

200 mg. of Funtumine are dissolved in 10 cc. of methanol. To this solution are added 200 mg. of potassium borohydride. The mixture is constantly stirred for 5 hours at room temperature. The excess of borohydride is then entirely consumed. The solution is poured into 100 cc. of water and the precipitate is extracted with an organic solvent such as ether or methylene chloride. The organic solution is dried and evaporated to dryness. The crystalline residue is recrystallized from ethyl acetate.

180 mg. of 20-epi-Funtumidine, M.P. 167° C., are obtained.

(2) Production of 3-amino derivatives of androstane from Funtumine

3-α-amino-androstane-17-β-ol.—The 17β-hydroxy compound of 3α-amino-androstane can be obtained by the action of peracids with the retention of the configuration in the 17-position. In this reaction, using peracetic acid, 17β-acetoxy-3-α-amino-androstane is obtained, together with 21-acetoxy-Funtumine. The latter product constitutes a byproduct of the reaction. These operations are summarized as follows:

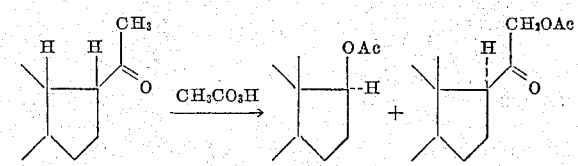

What is claimed is:
1. A product selected from the group consisting of 3-α-amino-allopregnane-20-ol and its therapeutically acceptable acid addition salt.
2. A product selected from the group consisting of

3-α-amino-allopregnane-20-one and its therapeutically acceptable acid addition salt.
3. 3-α-amino-allopregnane-20-ol.
4. The therapeutically acceptable acid addition salt of 3-α-amino-allopregnane-20-ol.
5. 3-α-amino-allopregnane-20-one.
6. The therapeutically acceptable acid addition salt of 3-α-amino-allopregnane-20-one.

No references cited.